United States Patent
Heinisch et al.

(10) Patent No.: US 10,386,267 B2
(45) Date of Patent: Aug. 20, 2019

(54) DEVICE FOR MEASURING AN IMAGING PROPERTY OF AN OPTICAL SYSTEM

(71) Applicant: TRIOPTICS GMBH, Wedel (DE)

(72) Inventors: Josef Heinisch, Wedel (DE); Ralf Poikat, Appen (DE)

(73) Assignee: TRIOPTICS GMBH, Wedel (DE)

( * ) Notice: Subject to any disclaimer, the term of this patent is extended or adjusted under 35 U.S.C. 154(b) by 0 days.

(21) Appl. No.: 15/573,434

(22) PCT Filed: May 7, 2016

(86) PCT No.: PCT/EP2016/000749
§ 371 (c)(1),
(2) Date: Nov. 10, 2017

(87) PCT Pub. No.: WO2016/180525
PCT Pub. Date: Nov. 17, 2016

(65) Prior Publication Data
US 2018/0136079 A1  May 17, 2018

(30) Foreign Application Priority Data
May 13, 2015 (DE) .......... 10 2015 006 015

(51) Int. Cl.
*G01M 11/02* (2006.01)
(52) U.S. Cl.
CPC .... *G01M 11/0264* (2013.01); *G01M 11/0235* (2013.01); *G01M 11/0292* (2013.01)
(58) Field of Classification Search
CPC ............. G01M 11/02; G01M 11/0207; G01M 11/0235; G01M 11/0242; G01M 11/0257;
(Continued)

(56) References Cited

U.S. PATENT DOCUMENTS 4,815,844 A * 3/1989 Schmalfuss ........ G01M 11/0278
250/559.42
5,801,822 A * 9/1998 Lafferty ............. G01M 11/0207
356/124

(Continued)

FOREIGN PATENT DOCUMENTS

DE 4003144 8/1991
DE 10339473 3/2005
(Continued)

OTHER PUBLICATIONS

Search Report dated Apr. 20, 2016, German Search Report cited in the corresponding German Application No. 102015006015.5, dated Apr. 20, 2016; 7 pages.
(Continued)

*Primary Examiner* — Gordon J Stock, Jr.
(74) *Attorney, Agent, or Firm* — Lempia Summerfield Katz LLC

(57) ABSTRACT

A device for measuring the MTF or another imaging property of an optical system has a light pattern generating unit that generates a light pattern in a focal plane of the optical system. A reference axis of the device is oriented along an optical axis of the optical system. The device further comprises an arrangement of N, N=2, 3, 4, . . . , cameras that are separated from one another. Each camera has an objective and a light sensor that is arranged in a focal plane of the objective. The cameras are arranged on a side opposite the light pattern generating unit such that the light sensor of each camera detects an image of exactly one section of the light pattern. At least one beam deflecting element is arranged between the optical system and at least one of the cameras such that it deflects light away from the reference axis before the light impinges on the at least one camera.

8 Claims, 3 Drawing Sheets

(58) Field of Classification Search
CPC ......... G01M 11/0264; G01M 11/0271; G01M 11/0278; G01M 11/0285; G01M 11/0292; G01M 11/025
See application file for complete search history.

(56) References Cited

U.S. PATENT DOCUMENTS

| | | |
|---|---|---|
| 8,817,246 B2 | 8/2014 | Tan et al. |
| 2005/0117149 A1 | 6/2005 | Grindinger et al. |
| 2010/0165329 A1 | 7/2010 | Lee et al. |
| 2012/0268588 A1* | 10/2012 | Eckerl ................ G01M 11/0207 348/135 |
| 2017/0011507 A1* | 1/2017 | Wong ................... G01N 21/896 |

FOREIGN PATENT DOCUMENTS

| | | | | |
|---|---|---|---|---|
| JP | 58085132 A | * | 5/1983 | ........ G01M 11/0292 |
| JP | 61029732 A | * | 2/1986 | ........ G01M 11/0292 |

OTHER PUBLICATIONS

International Search Report in co-pending International Patent Application No. PCT/EP2016/000749, dated Aug. 22, 2016, 2 pages.

\* cited by examiner

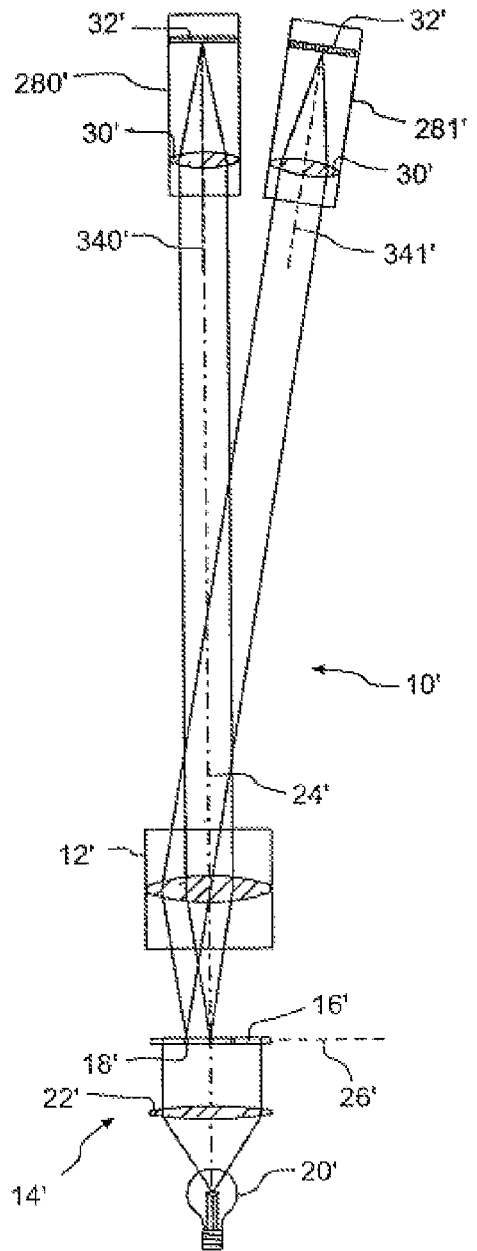
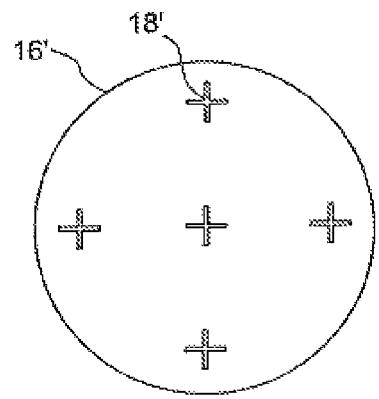
Fig. 2
(Prior Art)
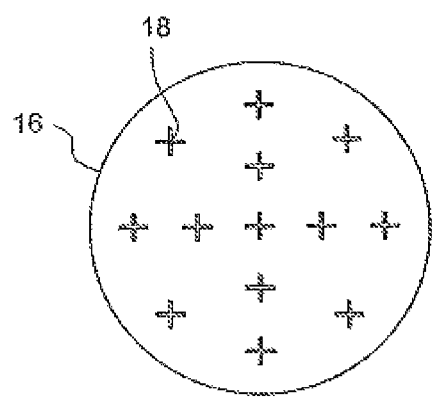
Fig. 1
(Prior Art)
Fig. 3

DEVICE FOR MEASURING AN IMAGING PROPERTY OF AN OPTICAL SYSTEM

RELATED APPLICATION DATA

This application is a U.S. national stage of and claims priority benefit to prior filed international application no. PCT/EP2016/000749, filed May 7, 2016, and which claims priority to German national application no. 10 2015 006 015.5, filed May 13, 2015. The entire contents of these prior filed applications are hereby incorporated by reference herein.

BACKGROUND OF THE INVENTION

1. Field of the Invention

The invention relates to a device for measuring an imaging property of an objective, of a lens or of another optical system. The imaging property can be, for example, the modulation transfer function (MTF).

2. Description of the Prior Art

Known in the prior art are devices for measuring an imaging property of an optical system, in which a light pattern, for example an arrangement of crosshairs or dots, is generated in a focal plane of the optical system. Arranged in the focal plane of the optical system to this end can be, for example, a stop which is illuminated by a light source and which has a pattern of stop apertures.

On the opposite face of the optical system, a plurality of cameras which are separated from one another are arranged, with each camera having an object and a light sensor that is arranged in a focal plane of the objective. The cameras are here distributed such that each camera captures the image of precisely one section of the light pattern by means of the camera light sensor. In this way, for example, it is possible to measure the modulation transfer function at a plurality of field positions independently of one another.

Owing to ever-increasing requirements for the imaging properties of optical systems, it is desirable to measure the modulation transfer function or another imaging property of the optical system at as many field positions as possible. Since each section of the light pattern requires a separate camera, which takes up a certain installation volume, it becomes difficult to arrange a greater number of cameras for a corresponding number of sections so closely together that the measurement light can enter the corresponding cameras from the desired direction.

SUMMARY OF THE INVENTION

It is therefore the object of the invention to specify a device for measuring an imaging property of an optical system, in which as many cameras which are independent of one another as possible can capture measurement light that exits the optical system from different directions.

According to the invention, this object is achieved by way of a device for measuring an imaging property of an optical system which has a light pattern generating device that is set up to generate a light pattern in a focal plane of the optical system. The device furthermore has a reference axis along which the optical axis of the optical system is able to be oriented, and has an arrangement of N cameras which are separated from one another, with each camera having an objective and a light sensor that is arranged in a focal plane of the objective. The cameras are arranged on a face opposite the light pattern generating device such that each camera captures the image of precisely one section of the light pattern by means of the camera light sensor, said image being produced with the aid of the optical system. According to the invention, the device furthermore has at least one beam deflecting element that is arranged between the optical system and the at least the camera so as to deflect the light striking the at least one camera away from the reference axis of the optical system.

By deflecting the light away from the reference axis, it is no longer necessary for all the cameras to be arranged in the vicinity of the reference axis, and they can be situated farther away therefrom. As a result it is possible in principle to utilize the entire half space on the light exit side of the optical system to be measured for arranging a multiplicity of cameras.

The at least one beam deflecting element can be arranged here such that the optical axis of at least one camera is perpendicular to the reference axis. In this way, the individual measurement light beams can be spread widely, as a result of which a corresponding amount of space is made available for the arrangement of the cameras.

If the number N of the cameras is greater than 4, it is possible for at least 4 first cameras and in particular also their optical axes to be arranged in a first plane. In this way, a very flat structural arrangement of the first cameras is made possible. This in turn creates the conditions for arranging further cameras in other parallel planes in staggered fashion. The first plane preferably extends perpendicular to the reference axis.

Using this concept as the basis, in another exemplary embodiment more than 9 cameras are provided, wherein at least 4 second cameras are arranged in a second plane which extends parallel to the first plane.

The first and the second cameras and the beam deflecting elements can in this case be arranged such that light, which exits the optical system at an angle $\alpha_1$ with respect to the reference axis, is deflected more strongly by the beam deflecting elements and directed at the first cameras, and light, which exits the optical system at an angle $\alpha_2 > \alpha_1$ with respect to the reference axis, is deflected less strongly and is directed at the second cameras, with the first plane being arranged farther away from the optical system than the second plane. This concept, which makes possible a particularly efficient utilization of the installation space, can also be expanded to three or more planes. As a result, the number of the measurable field positions can be increased further.

The cameras that are arranged in a plane are preferably arranged in the shape of a ring around the reference axis. The optical axes of the cameras having a ring-shaped arrangement are here preferably distributed equidistantly in terms of angle in a plane. In this way, a symmetric arrangement of the cameras on the light exit side of the optical system is achieved.

The cameras arranged in one plane and the beam deflecting elements which are associated therewith can be attached to a common support structure, which can be in the form of a ring-shaped mounting plate, for example. In this way, a plurality of planes having a plurality of cameras each can be arranged one behind the other in staggered fashion using structurally simple means.

The light pattern generating device can have a light source and a stop which is able to be illuminated by the light source and is able to be arranged in the focal planes of the optical system and which has a pattern of stop apertures. Alternatively, the light pattern generating device can also comprise an arrangement of self-luminous point light elements, e.g. LEDs.

The beam deflecting elements are preferably plane mirrors or deflecting prisms. However, curved mirrors or diffractive optical elements are also possible.

Preferably, exactly one camera has an optical axis that is flush with the reference axis. The light striking this camera is thus not deflected by beam deflecting elements.

BRIEF DESCRIPTION OF THE DRAWINGS

Further features and advantages of the invention can be gathered from the following description of the exemplary embodiments on the basis of the drawings, in which:

FIG. 1 shows a schematic meridional section through a measurement device in accordance with the prior art;

FIG. 2 shows a plan view of a stop, which is part of the measurement device shown in FIG. 1;

FIG. 3 shows a stop, the image of which is captured in a measurement device according to the invention by a plurality of cameras;

DESCRIPTION OF THE PRIOR ART

Figure 4:
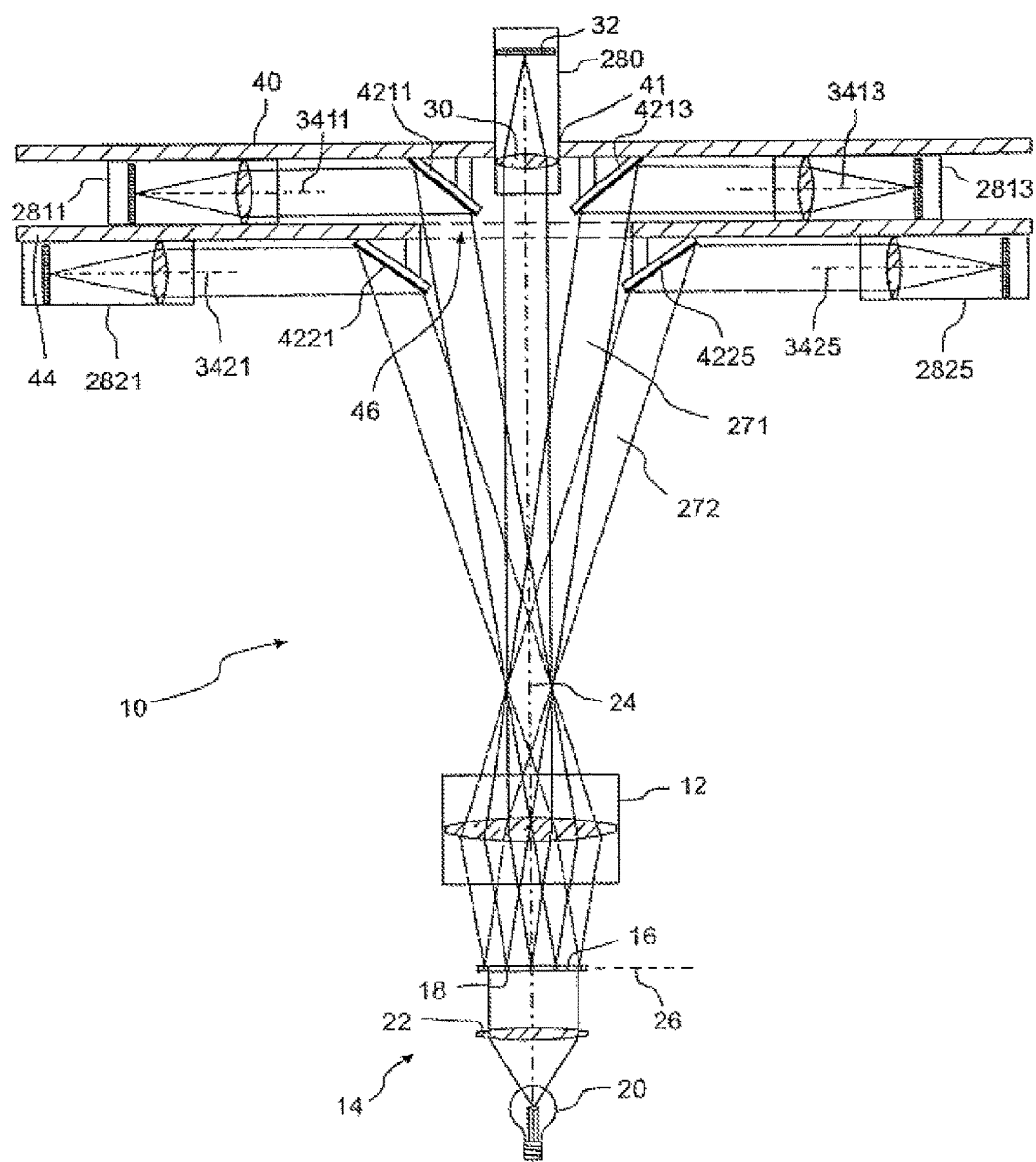
FIG. 4 shows a meridional section through a measurement device according to the invention.

To explain the mode of function of the measurement device according to the invention, reference is first made to FIG. 1, which shows a measurement device according to the prior art in a schematic meridional section which is designated 10' in its entirety.

The measurement device 10' is intended for measuring the modulation transfer function (MTF) of an optical system, which will be referred to below as device under test 12'. The device under test 12' is indicated here merely as a single lens; frequently, this will be an optical system having a plurality of refractive and/or reflective optical elements.

The modulation transfer function represents an important aid in quantitatively assessing the imaging quality of optical systems and describes the resolution performance of an optical system by way of the ratio of the relative image contrast to the relative object contrast. When an object is imaged by an optical system, aberrations and diffraction events inevitably produce a reduction in quality in the image plane. Manufacturing deviations and mounting and orientation errors also weaken the imaging performance of the device under test 12'.

To measure modulation transfer function, the device under test 12' forms an object; the modulation transfer function of the device under test 12' can be deduced from the image of the object. The object imaged by the device under test 12' is formed by a light pattern that is generated by a light pattern generating device 14'. The light pattern generating device 14' has a stop 16', which has a plurality of stop apertures 18'. FIG. 2 shows a plan view of the stop 16', in which the arrangement of the stop apertures 18' can be seen. The stop apertures 18' here take the form of cross slots that are distributed in a regular arrangement over the stop 16'. The distance of the outermost stop apertures 18' from the stop center is identical here. The stop 16' is uniformly illuminated by a light source 20', which is represented in the form of a light bulb, using a condenser 22'.

The device under test 12' is arranged in the measurement device 10' such that its optical axis is flush with a reference axis 24' of the measurement device 10'. The reference axis 24' of the device 10' here coincides with the optical axis of the condenser 22'. In addition, the device under test 12' is positioned axially such that the stop 16' is arranged in the focal plane 26' of the device under test 12'. As a result, the light pattern defined by the stop apertures 18' is imaged to infinity by the device under test 12'.

Arranged on the face of the device under test 12' opposite the light pattern generating device 14' are two cameras 280', 281' of identical construction. The cameras 280', 281' each contain one objective 30' and a spatially resolving light sensor 32', which is situated in a focal plane of the objective 30'. Hereby, in each case a section of the light pattern generated by the light pattern generating device 14' is produced on the light sensor 32'. The section is here defined, among other things, by the arrangement of the cameras 280', 281' with respect to the reference axis 24'. The camera 280', whose optical axis 340' is flush with the reference axis 24', captures an image of the stop aperture 18' in the center of the stop 16'.

The optical axis 341' of the other camera 281' is arranged at an inclination with respect to the reference axis 24'. As a result, the camera 281' captures the image of one of the outermost stop apertures 18'.

Furthermore arranged around the central camera 280' are three further cameras, which are not illustrated in FIG. 1 for reasons of clarity. These three further cameras capture the images of the three other outermost stop apertures 18'. By evaluating the images of the stop apertures 18', which are produced on the light sensors 32' of the cameras 280', 281', it is possible to determine the modulation transfer function of the device under test 12' in a manner known per se. It is possible using the known measurement device 10' illustrated in FIGS. 1 and 2 to measure the modulation transfer function at five different field positions.

However, it is not possible to make any statement relating to the modulation transfer function for field positions between the five stop apertures 18'. For this reason, it is generally desirable if the modulation transfer function can be measured independently at as many different field positions as possible.

However, FIG. 1 clearly shows that even with five field positions to be measured, the two cameras 280', 281' which are illustrated and the three further cameras which are not illustrated need to be arranged very closely together. Consequently, for any measurement to take place e.g. at 13 field positions, possibly using the stop 16 shown in FIG. 3, 13 cameras must be arranged around the reference axis 24'. Since the cameras cannot be miniaturized arbitrarily, the modulation transfer function cannot be measured using the conventional construction the measurement device 10' at this many field positions.

DESCRIPTION OF A PREFERRED EXEMPLARY EMBODIMENT

FIG. 4 shows a measurement device 10 according to the invention in a meridional section similar to FIG. 1, with which measurement even at 13 or more field positions is possible. Parts which are also contained in the known measurement device 10' in an identical or similar manner are designated with the same reference sign, but without the apostrophe, and will not be explained in detail again.

In order to be able to image each of the N=13 stop apertures 18 shown in FIG. 3 separately from one another on in each case one image sensor 33, the measurement device 10 according to the invention has a corresponding number of N=13 cameras, which are largely arranged in two different planes.

Five cameras 280, 2811, 2813, 2821 and 2825 out of the N=cameras are illustrated in the meridional section of FIG. 4. The cameras have the same construction as the cameras 280', 281' shown in FIG. 1 and thus comprise in each case one objective 30 and a spatially resolving light sensor 32 that is arranged in the focal plane of the objective 30.

The cameras 2811 and 2813, which can be seen at the top of FIG. 4, are attached to a first mounting plate 40, which is arranged perpendicular with respect to the reference axis 24 of the measurement device 10. The first mounting plate 40 has a central opening 42, through which the vertically oriented camera 280 extends. Using the camera 280, the modulation transfer function for the axial field position can be measured.

The cameras 2811, 2813 are oriented in horizontal fashion, with the result that their optical axes 3411 and 3413 are coplanar and perpendicular to the reference axis 24. In order to direct collimated light beams 271, which travel at an angle with respect to the reference axis 24, at the cameras 2811 and 2813, plane deflection mirrors 4211 and 4213, which deflect the light beams 271 by an angle $\alpha_1$ in the meridional plane, are additionally attached to the first mounting platform 40.

A second mounting plate 44, to which the remaining cameras are attached, extends below the cameras 2811, 2813. The second mounting plate 44 has a larger central opening 46, the diameter of which is dimensioned such that the inclined light beams 271 can pass through and strike the deflection mirrors 4211, 4213.

Overall, 8 cameras are attached to the second mounting plate 44, of which only the cameras 2821 and 2825, which are arranged in the meridional section, are illustrated. The optical axes 3421 and 3425 thereof likewise extend in coplanar fashion in a second plane, which extends parallel with respect to the first plane. In order to direct the light beams 272 which are inclined more strongly with respect to the reference axis 24 into the cameras 2821, 2825, further deflection mirrors 4221, 4225 are attached to the second mounting plate 44, which mirrors effect a beam deflection by an angle $\alpha_2 < \alpha_1$.

Figure 5:
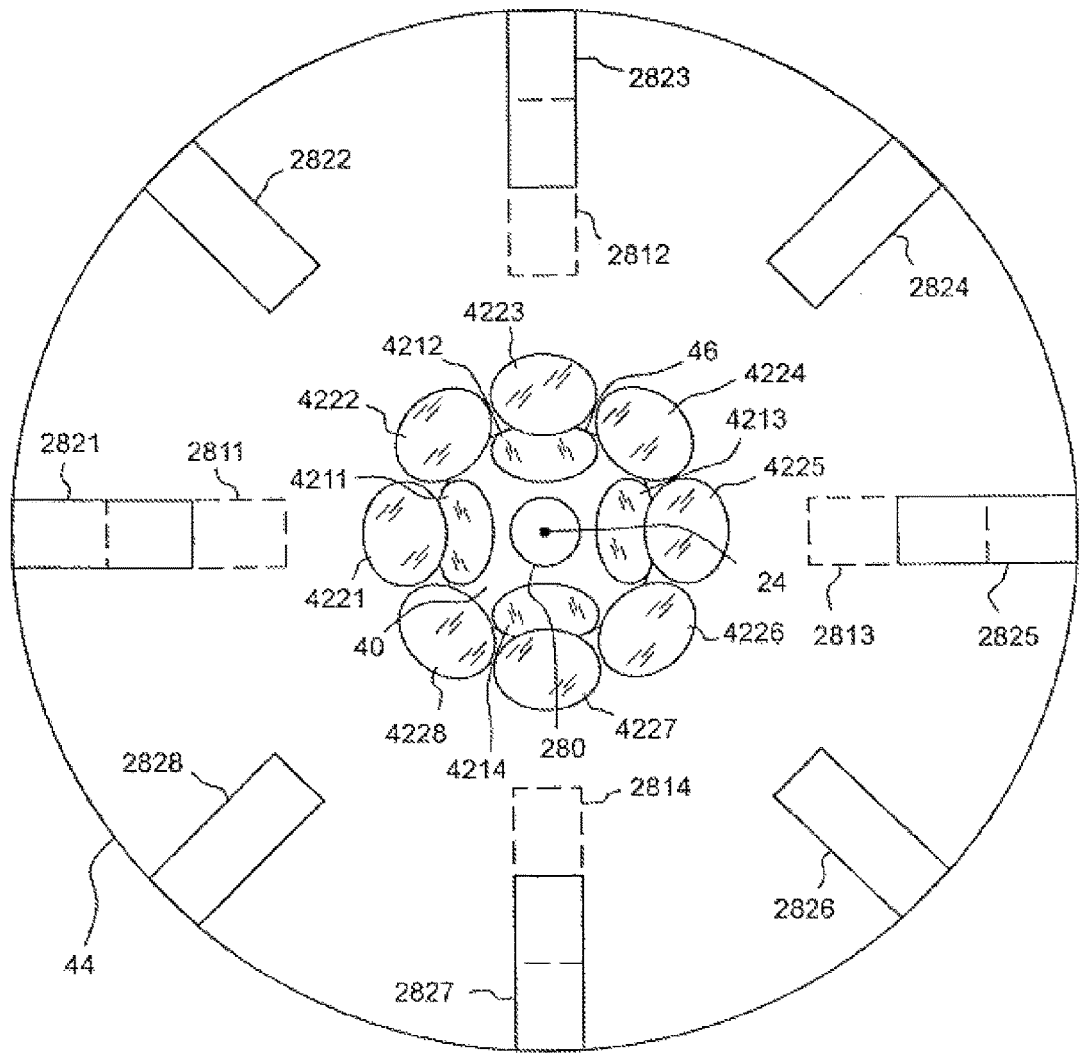
FIG. 5 shows a view of an arrangement of beam deflecting elements, which is part of the measurement device shown in FIG. 4.

FIG. 5 shows a view of the arrangement of the N=13 cameras in the light propagation direction, i.e. in FIG. 4 from below. In this illustration, the arrangement of the eight cameras 2821 to 2828 on the second mounting plate 44 can be seen. The cameras 2821 to 2828 are distributed around the reference axis 24 equidistantly in terms of angle, with the result that the angle between the optical axes of two neighboring cameras 2821 to 2828 is always 45°.

Accordingly, the eight deflection mirrors 4221 to 4228, which are associated with the cameras, are also distributed around the reference axis 24 equidistantly in terms of angle.

The arrangement of the four deflection mirrors 4111 to 4114, which are associated with the cameras 2821 to 2824 that are indicated in dashed lines in FIG. 5, can be seen through the opening 46 in the second mounting plate 44.

As can be seen from FIGS. 4 and 5, it is possible using the 12 deflection mirrors 4111 to 4114 and 4221 to 4228 to arrange the N=13 cameras 280, 2811 to 2814 and 2821 to 2825 farther away from the reference axis 24. This is a consequence of the deflection mirrors 4111 to 4114 and 4221 to 4228 deflecting the light striking the cameras 2811 to 2814 and 2821 to 2825 away from the reference axis 24. The deflection mirrors 4111 to 4114 and 4221 to 4228 require no housing and can therefore be dimensioned such that their area is practically illuminated completely by the inclined light beams 271, 272. As a result, the deflection mirrors 4111 to 4114 and 4221 to 4228 can be arranged much more closely together than would be the case with cameras.

As shown in FIG. 5, it is not possible to increase the number of the cameras—and thus the number of the field positions that can be measured independently from one another—arbitrarily using the deflection mirrors 4111 to 4114 and 4221 to 4228 either. If the number of the field positions which are measurable independently from one another is intended to be greater than 13, either the deflection mirrors must be smaller or further deflection mirrors must be arranged in a third plane, which is possible e.g. due to a greater distance between the device under test 12 and the arrangement of the cameras.

The invention claimed is:

1. A device for measuring an imaging property of an optical system having a focal plane and an optical axis, the device comprising:
   a) a light pattern generating unit configured to generate a light pattern in the focal plane of the optical system;
   b) a reference axis configured to be oriented along the optical axis of the optical system;
   c) an arrangement of N cameras, which are separated from one another, wherein N=2 or more, wherein
      each camera has an objective and a light sensor arranged in a focal plane of the objective, and
      the cameras are arranged on a side opposite the light pattern generating unit such that the light sensor of each camera detects an image of exactly one section of the light pattern, the image being produced with the contribution of the optical system; and
   d) at least one beam deflecting element, which is arranged between the optical system and at least one of the cameras such that the at least one beam deflecting element deflects light away from the reference axis before the light impinges on the at least one camera.

2. The device of claim 1, wherein an optical axis of at least one camera is arranged perpendicular to the reference axis.

3. The device of claim 1, wherein N>4 and wherein the cameras include at least four first cameras that are arranged in a first plane.

4. The device of claim 3, wherein the at least one beam deflecting element comprises a plurality of beam deflecting elements, and
   wherein cameras arranged in a common plane and the plurality of beam deflecting elements associated with those cameras are attached to a common support structure.

5. The device of claim 4, wherein the support structure has a ring-shaped mounting plate.

6. The device of claim 3, wherein N>9 and wherein the cameras include at least four second cameras that are arranged in a second plane extending parallel to the first plane.

7. The device of claim 6, wherein the at least one beam deflecting element comprises a plurality of beam deflecting elements, and
   wherein the plurality of beam deflecting elements deflect light incident on the at least four first cameras less than light incident on the at least four second cameras.

8. The device of claim 7, wherein the at least four first cameras and the at least four second cameras and the plurality of beam deflecting elements are arranged such that light, which exits the optical system at an angle $\alpha 1$ with respect to the reference axis, is deflected more strongly by the plurality of beam deflecting elements and directed at the at least four first cameras, and wherein light, which exits the optical system at an angle $\alpha 2 > \alpha 1$ with respect to the reference axis, is deflected less strongly and directed at the at least four second cameras, and wherein the first plane is arranged farther away from the optical system than the second plane.

* * * * *